May 22, 1956  C. DIEHL  2,747,065
METHOD FOR WELDING A JOINT
Filed Nov. 1, 1951  2 Sheets-Sheet 1
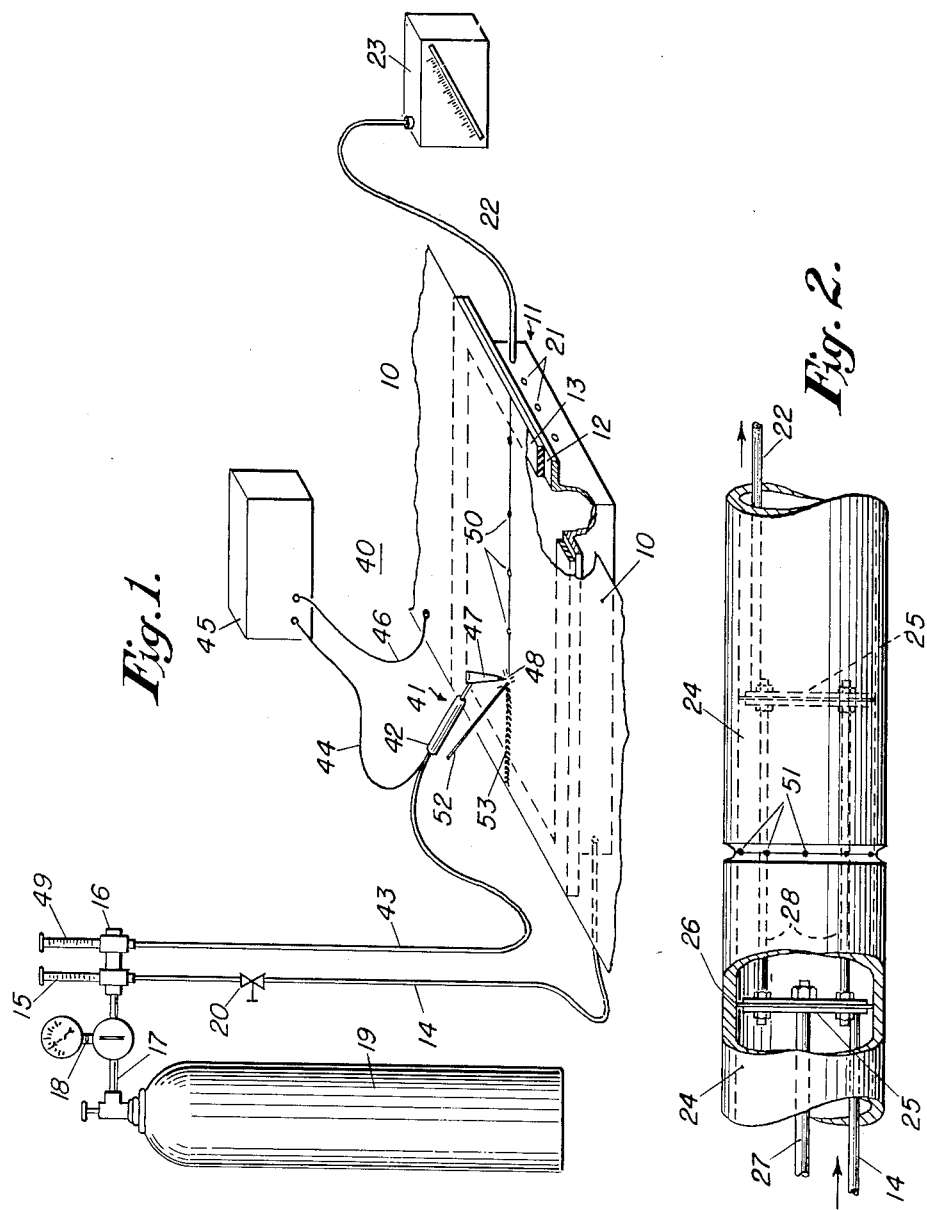
INVENTOR.
Charles Diehl
BY
Virgil F. Davico
Attorney May 22, 1956 — C. DIEHL — 2,747,065
METHOD FOR WELDING A JOINT
Filed Nov. 1, 1951 — 2 Sheets-Sheet 2

INVENTOR.
Charles Diehl
BY
Virgil F. Davis
Attorney

United States Patent Office 2,747,065
Patented May 22, 1956

2,747,065

METHOD FOR WELDING A JOINT

Charles Diehl, Ridgefield, N. J., assignor to The M. W. Kellogg Company, Jersey City, N. J., a corporation of Delaware Application November 1, 1951, Serial No. 254,427

12 Claims. (Cl. 219—10)

This invention relates to seam welding and more particularly to a method for producing welded joints of high quality.

The quality of a welded joint depends largely on the completeness of the coalescence of the weld metal with the metal of the ends joined. When the metal ends are of sufficient thickness and both sides of the joint are accessible for welding, high quality welds can generally be produced without great difficulty. When, however, the metal ends are of a thickness that a single weld bead completes the weld, or they are in such form and shape that only one side of the joint is accessible, the consistent attainment of high quality welded joints poses a difficult problem. In such cases, it is required that complete penetration at the root of the joint be secured and a uniform root bead of required contour and free from undercuts, overlays and drip-throughs be produced without the welder being able to observe the root side of the weld during the welding thereof. Regardless of the skill of the welder and the sensitiveness of the control apparatus, these requirements cannot be met with conventional welding practices; the usual result is a weld whose root is of poor quality and of unpredictable strength. The contour of the root bead is very irregular and solidified drops of metal, "cherries" or "dingleberries," extend therefrom evidencing burn-throughs. Penetration is irregular and sufficiently incomplete in places to provide crack-starting notches at the root face.

In an effort to improve the quality of the root of the joint the art has resorted to back-up devices. These devices which may be metallic or non-metallic, provide for better penetration control but do not eliminate root bead toe defects such as undercutting and weld metal overlay. If root bead toe defects are to be kept to a minimum the back-up must closely contact the root side of the edges to be joined; this generally entails considerable expense.

The metal back-ups, usually referred to as chill-bars or chill-rings, cause rapid cooling of the weld metal; this is in many cases objectionable as it sets up conditions which promote root cracks. The chill bars, or chill rings, if removable after welding are usually made of copper to prevent fusion of the weld metal thereto. Fusion of the weld metal to a copper chill is not unusual, in which case removal of the chill is a costly operation. Also, there is always danger of copper pick up in the weld metal; this in the special analysis materials developed for extreme service conditions is almost always objectionable.

The non-removable chill-rings, or bars, are usually of a metal of the same analysis as the metal of the ends joined and when used, complete penetration of the edges joined can be secured, if the fit between the chill and the joint is close, and overlay of weld metal and undercutting can be kept within acceptable limits. Non-removable chills, however, are always expensive and lead to root cracks. In addition, since the chill is always wider than the root deposit, a notch where cracks may start is inherent at each side of the joint. Furthermore, non-removable chills make X-ray examination of the welded joint difficult and uncertain.

Back-ups as used in the art are a compromise rather than a solution of the problem involved in securing high quality root deposits by welding from the other side of the joint and unnecessarily complicate the procedure and materially increase its cost.

It is the principal object of this invention to provide a method for forming a welded joint of high quality whose root side is free from defects, by welding the whole of the joint from the front side thereof and without the use of back-ups and similar devices.

It is also an important object of this invention to provide a method for depositing a root bead of weld metal between edges to be joined which completely coalesces into said edges and whose root face is smooth, uniform and free from defects, without the use of back-ups and similar devices.

It is also a primary object of this invention to provide a simple, practical and inexpensive method for forming the root of a welded joint by welding from the other side, that may be carried out by operators of usual skill to invariably obtain a root deposit that completely coalesces into the metal of the ends joined and whose root face is smooth, uniform and of a predetermined contour while free from cracks, notches, undercutting and weld metal overlay.

It is also a major object of this invention to provide a method for fusing a root bead of weld metal between metal edges in which a positive static gas pressure is maintained against the root side of said bead during the fusion thereof, said gas pressure being controlled to provide said root bead with a smooth substantially uniform root face free from undercutting, metal overlay, cracks and other weakening defects.

It is a further major object of this invention to provide a method for fusing a root bead of weld metal between metal edges in which during the fusion of said root bead said edges are fused to the root side thereof while a positive gas pressure is maintained against said root side, said gas pressure being controlled to provide said root bead with a smooth substantially uniform root face of predetermined contour and free from undercutting, metal overlay, cracks and other weakening defects.

The further features, advantages and objects of this invention will be apparent from a consideration of the following detailed description thereof taken with the accompanying drawings in which:

Fig. 1 is a diagrammatic view, partly in section, showing an apparatus setup for welding a joint in accordance with the invention;

Fig. 2 is a fragmentary front view of a pair of pipe ends prepared for welding in accordance with the invention;

Figure 3:
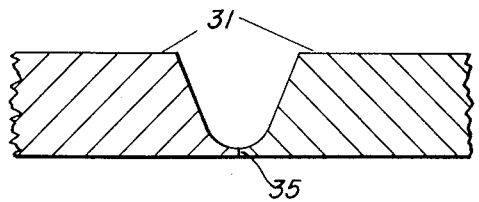
Fig. 3 is a front sectional view showing a pair of ends having a typical form of welding groove formed therein.

The novel method of the invention may be advantageously employed in the welding of articles made of any of the metals and alloys now considered weldable. The weldable metals and alloys include the ferrous metals, the carbon steels, the alloy steels of both low and high alloy content, the special service steels and alloys such as the high-temperature high-strength alloys, the low-temperature high-strength alloys, etc., and copper, nickel, aluminum, magnesium, titanium, and their alloys. The novel method is particularly applicable to the welding of the metals and alloys used in the fabrication of articles intended for use under extreme conditions as with such articles the dependability, predictability and quality of the joints therein are of utmost importance.

The novel method is applicable to the welding of thin material defined as material of a thickness within the sheet metal range and up to and including 1/8" gauge which requires a single weld bead to complete the joint, as well as thick material, defined as material of a thickness greater than 1/8" gauge but which includes welding lips of a thickness up to 1/8" gauge. The novel method in its broader aspects applies to the formation of the first weld bead, or root bead, in producing a welded joint between metal ends whether said root bead constitutes the sole bead of the joint, or is the bottom bead upon which subsequent beads are formed on either or both sides thereof. The high quality of the root bead, and particularly the high quality of the root face thereof, renders the novel method especially applicable to the welding of metal ends which either by reason of insufficient thickness or by reason of the shape and form of the welded article which includes them must perforce be welded entirely from one side of the joint.

When forming a joint in accordance with the invention, the ends to be joined are first abutted and aligned, and then preferably but not necessarily tack welded together to maintain their abutted and aligned relation. Since the root bead, as explained hereinafter, is deposited while a positive static gas pressure is maintained against the root side of the joint, the edges are preferably closely abutted or otherwise sealed to keep gas leakage through the seam to a practical minimum. The tightness of the seam may be increased by using a proper number of properly spaced tack welds. Positive static pressure as used herein is distinguished from the pressure due to velocity of flow of the fluid and is the static pressure on the root face of the seam in excess of the static pressure on the front face of the seam and, since welding is usually performed at atmospheric pressure, will be expressed as the gauge pressure rather than absolute pressure. While the tack welds may be deposited in any preferred conventional manner, the best results are obtained when they are deposited while a positive static gas pressure is maintained against the root side of the seam. Thus, prior to the tack welding, means are preferably positioned relative to said ends for maintaining a predetermined positive static gas pressure against the root side of the joint.

If the ends to be joined are of flat material, as are the ends 10 of Fig. 1, the positive gas pressure maintaining means may conveniently include the open top box like structure 11, provided with a peripheral flange 12 to which the ends 10 are clamped in any suitable manner, not shown. To provide a comparatively gas tight joint, a suitable gasket 13 of rubber or similar deformable material may be interposed between the flange 12 and the ends 10. The pressurizing gas is supplied to one end of the box structure 11 by the line 14 connected to the flow meter 15, of conventional design, which is carried on the gas manifold 16. A line 17, carrying a conventional pressure reducing valve arrangement 18, is connected to the manifold 16 and the pressure bottle 19. A pressure regulating valve arrangement 20, also of conventional design, is provided in the line 14. The valve arrangement 20 is of such a character that it will regulate the flow of gas through the line 14 to maintain a predetermined pressure within the box construction 11. The box construction 11 is preferably provided with a plurality of small vent holes 21. A gas flow through the holes 21 in the order of two to five liters per minute makes it easier to maintain a steady pressure within the box construction 11 and assures removal of unwanted gases therefrom. The pressure regulator 20 must provide for venting on the box structure 11 side thereof when the holes 21 are omitted. The box structure 11 is desirably connected to a manometer 23 by a line 22 for visual indication of the gas pressure therein.

If the ends to be joined are part of a vessel or similar closed body, the structure 11 will be substituted by one or more plugs or diaphragms which isolate the inside of the joint from the atmosphere. Thus, when the ends joined are pipe ends, as the pipe ends 24 of Fig. 2, a sealing diaphragm or plug 25 is positioned adjacent the joint in each pipe end 24, said plugs 25 being spaced from the joint to prevent damage thereto by the welding heat. Each of the plugs 25 preferably includes a peripheral gasket 26 of rubber or similar sealing material. When the pipe ends 24 are both straight or substantially so, each of the plugs 25 may have a pull rod 27 attached thereto to facilitate withdrawal after welding, or as shown, the plugs 25 may be connected by a plurality of rods 28 and only one of the plugs 25 provided with a pull rod 27. When the pipe ends 24 include bends therein, the pull rod 27 and the rods 28 may be substituted by flexible members such as flexible cable or chain. One of the plugs 25 has connected thereto the pressure gas line 14 while the same or the other plug 25 has the manometer line 22 connected thereto, when a manometer 23 is employed. Said other plug 25 is preferably provided with vent holes therein similar to the holes 21 and for the same purpose.

The positive gas pressure maintained against the root side of the joint during the deposition of the root bead as well as during the deposition of the tack welds, acts as a fluid mold for the molten weld metal and shapes it to provide a smooth, uniform root face of desired contour. Such fluid mold makes complete penetration of the edges joined, throughout the full depth thereof and to the toes of the root face of the weld deposit, without undercutting, metal overlay, cracks and other weakening defects in the weld metal and the adjacent edge metal, a simple matter.

Complete penetration of the edges joined has been obtained with complete absence of cracks in the deposited weld metal as well as the edge metal adjacent thereto, and with the root face of said deposited metal evidencing a smooth and uniform contour and complete absence of toe defects such as undercutting and metal overlay, by employing positive static gas pressures ranging from as low as 0.0003 p. s. i. gauge to as high as 0.08 p. s. i. gauge. At the lower end of the positive static gas pressure range set forth, the root face of the weld deposit while uniform and smooth and not distinguishable from the front face of a cover, or top, weld bead deposited within complete view and control of the welder, is convex and extends below the bottom face of the edges joined. As the pressure is increased the convexity of said root face diminishes until it substantially coincides with said bottom face. As the pressure is increased further said root face becomes concave and extends above said bottom face. The positive static gas pressure employed in each particular case will depend on the desired root face contour of the weld deposit, and the characteristics of the weld metal such as density, heat conductivity etc. Generally speaking convex root face contours will be obtained when the static pressure employed is less than the pressure head equivalent due to the molten weld metal, static pressure in the order of said pressure head will produce substantially flat root face contours while static pressures in excess of said pressure head will produce concave root face contours.

Any gas, or mixture of gases, at the proper pressure will satisfactorily perform the supporting and shaping functions. However, as most weldable metals are deleteriously effected and undesirable metallurgical results are produced when they are exposed while in the highly heated state to some gases, the gas, or gas mixture, used in any particular case is preferably one that is inert or does not adversely effect the metal welded. The noble gases, and particularly helium and argon, are now readily available commercially. These gases are completely inert and are ideal gases for the purpose. Argon because of its greater weight and the advantages that follow therefrom is at present preferred as the pressurizing medium.

When the ends joined are thin, as for example the ends 10 of Fig. 1, no groove preparation is required other than the shaping necessary to make alignment and close abutment of said ends possible. If such edges are thick, as for example the ends 24 of Fig. 2, they are formed into complementary groove components by appropriate shaping operations before alignment and abutment thereof.

Considerable latitude in groove configuration is possible, practically any of the conventional groove shapes may be employed. Thus a conventional U groove is shown in Fig. 2. Whatever groove shape is employed, it is essential that each of the ends include a thin lip, the lip 35 of Fig. 3, which extends a considerable distance from the main body of its respective end and which is of a thickness within the sheet metal range, above set forth, at least for the full width thereof ultimately incorporated in the root bead.

It has been found in practice that the best results are obtained when the thickness of the lip is about $\frac{1}{8}''$ or less; the present preferred lip thickness is about $\frac{1}{32}''$. With lip thickness in the order of $\frac{1}{32}''$, cracking in and adjacent to the weld metal, is eliminated as welding groove lips in this order of thickness deform when subjected to the stresses attendant the temperature changes and the shrinkage of the weld metal. Welding lips of this order of thickness require a comparatively low degree of welding heat to completely penetrate them; thus the welding operation is more easily controlled and may be performed with simple equipment of comparatively low amperage.

Figure 4:
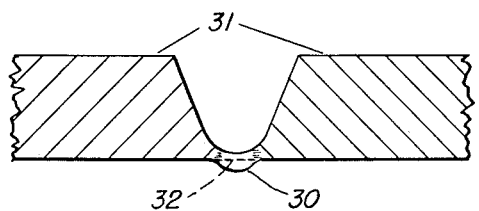
Figs. 4, 5 and 6 are views similar to that of Fig. 3 and show root beads deposited in the respective grooves.

The welding heat required for forming the tack welds as well as that required for forming the root bead, may be supplied from any convenient source. Thus, a high temperature gas flame, oxy-acetylene, etc., or an electric arc discharge may be used. It has been found in practice that the best results are obtained when the source of welding heat employed provides a highly concentrated, or compact, high temperature heating zone with a minimum disturbance of the molten pool of weld metal. Gas flames are generally too dispersed to produce the best results while electric arcs struck from consumable electrodes disturb the molten weld metal pool to such an extent as to make control of the operation difficult. The gas shielded metal arcs, those that are struck from consumable metal electrodes as well as those that are struck from non-consumable metal electrodes but especially those that are struck from non-consumable metal electrodes, such as tungsten, while the electrodes are surrounded by a stream of gas, provide an intense heating zone which is confined to a comparatively small area and with little or no force exerted by the arc or the shielding gas which tends to disturb the molten metal pool. These gas shielded metal arcs produce molten metal pools which, as shown diagrammatically in Figs. 4, 5 and 6, vary little in width from the top surface to the bottom surface thereof. Disregarding the curved top and bottom surfaces of these metal pools, the cross-section of these pools is generally rectangular rather than triangular. While in Figs. 4, 5 and 6, the fusion line is substantially normal to the bottom surface of the plate 31, it is to be remembered that this showing is diagrammatic only and that in actual practice the weld metal pool will be somewhat wider at the top than at the bottom as there is bound to be a temperature lag between the top surface and the bottom surface of the weld metal pool. The noble gases, helium, argon, etc., are ideal as the shielding medium since they are completely inert, effectively protect the weld metal from the atmosphere, and provide remarkably quiet and stable arcs. Argon is the preferred shielding medium as it excells in the desirable properties just mentioned, also due to its greater density it more effectively shields the weld metal during and after welding.

The static pressures applied to the root face of the seam are not depended upon to support the full weight of the molten pool of weld metal, actually only the static pressures at the upper end of the useful ranges set forth above are large enough to support said full weight. Hence for satisfactory results, the fusion of the edges must be carried out in such a manner that the pool of molten weld metal produced is of such size and fluidity that the adhesive forces set up between the molten metal thereof and the surrounding solid metal are sufficient to support at least a considerable portion of the weight thereof and the cohesive forces within said molten pool are sufficient to hold it together without formation of discrete projections on the root face thereof. This requirement indicates a comparatively narrow pool of molten weld metal. Since the weldable materials vary widely in characteristics and properties it is not possible to set forth a range of weld metal pool widths satisfactory for all weldable materials, however, the proper pool width in any particular case can be arrived at from the above teachings by trial.

A convenient apparatus for supplying the welding heat under conditions that make possible sufficienlty narrow beads is the well-known "heli-arc" welding apparatus. Such apparatus is available in various capacities, the higher capacities employ a water cooled torch while the lower capacities employe a gas cooled torch. The 120 ampere rated "heli-arc" apparatus is of sufficient capacity for the purposes of this invention and is preferred as with the lighter gas cooled torch the welding is easier to perform and better control is possible.

In Fig. 1 is shown a low capacity "heli-arc" apparatus 40 which includes a gas cooled torch 41 having a hollow handle 42 in which enter the gas line 43 and the current conducting cable 44. The cable 44 is connected to the welding current source, located in back of the panel 45 which is provided with the usual indicating dials and control handles, not shown. The other side of the welding current source is grounded to the ends 10 through a cable 46. The torch 41 includes a head 47 in which is mounted the tungsten electrode 48 which extends from said head 47 and is electrically connected to the cable 44. The gas from line 43 passes through the handle 42 and the head 47 thereby cooling them, and issues from the bottom of the head 47 in a stream encircling the electrode 48 and directed toward the work. The gas line 43 is connected to the flow meter 49, also conventional, carried on the manifold 16 which is in communication with the argon gas bottle 19.

The tack welds 50 and 51 are deposited at the chosen locations with the apparatus just described after the predetermined positive pressure has been established beneath their respective joints and after sufficient volume of the pressurizing gas has escaped through the vent holes, the holes 21 of Fig. 1, to assure substantially complete removal of atmospheric gases from beneath said joints. In depositing each of said tack welds 50 and 51 the arc is ignited, as for example by discharging high frequency current from the end of the electrode 48 to provide an ionized path for the discharge of the welding current, and maintained in position to fuse a small area of the abutted edges. Filler metal may be added to the molten weld metal pool as by fusing the filler wire 52. The heating of the molten weld metal pool is continued until said pool sinks at which time complete penetration of the edges is attained and the weld completed. If heating is discontinued before the molten metal pool sinks penetration is incomplete and the tack weld will be weak. However, no permanent damage will result as the tack welds are erased during the welding of the root bead. If heating is continued after the molten metal pool sinks the pressurizing gas will soon erupt through said pool. Erupted tack welds are also erased during the welding of the root bead. Gas eruption occurs on continued heating after the sinking of molten metal pool as such heating increases the diameter of the pool and the temperature of the central portions thereof. The enlargement of the pool increases the weight of the molten metal in said pool while the adhesive forces between said molten metal and the surrounding metal are not increased proportionately; the raising of the temperature of the central portions of the molten metal pool greatly reduces the cohesive forces thereof. As a result the root face of the molten metal pool increases its downward deflection and especially at the central portion thereof so that the depth of the molten metal pool is reduced at said central portion. This reduction in pool depth and the reduction in the cohesive forces enables the pressurizing gas to penetrate the central portion of the molten metal pool and erupt therethrough.

As the deposition of the tack welds, 50 or 51, progresses the shrinkage of the metal thereof draws the respective ends 10 or 24 more closely together and the leakage of the pressurizing gas diminishes as evidenced at the flow meter 15.

After the tack welding is completed the root bead is deposited. In depositing the root bead for example the root bead 53 of Fig. 1, the predetermined gas pressure is established within the box construction 11 and the torch 41 is moved to one end of the seam whereat the arc is ignited from the end of the electrode 48 in the manner heretofore indicated. The arc is played on a localized area of the seam until a pool of molten weld metal is produced; filler metal may be added when desired by fusing the filler wire 52. The arc is maintained over said localized area until complete penetration of the edges 10 is indicated by the sinking of the molten pool of weld metal. At this time the arc is advanced to produce a second pool of molten metal which overlaps the first produced pool. When said second pool sinks the arc is again advanced to produce a pool of molten metal which overlaps said second pool. This procedure is continued until the root bead 53 extends over the desired portion of the original seam. Heating of any of the pools should not be continued for any length of time after the sinking thereof as otherwise gas eruption through the metal of the pool will take place.

For the reasons set forth above, the heat input through the arc at the end of the electrode 48 will be controlled to produce molten pools, and consequently, a root bead 53 of a comparatively narrow width. While a step by step operation has been described, the torch 42 may be advanced, either manually or automatically, constantly at such a rate that one section of the pool is continuously sinking while another section is undergoing fusion. If the size of the molten weld metal pool is maintained small as indicated, the welding may be performed with the torch 41 directed downwardly, as in Fig. 1, or upwardly or horizontally. Regardless of the torch position complete penetration and a properly shaped root face free from defects will always be obtained.

When closed shapes which can be rotated about an axis, such as the pipe ends 24 of Fig. 2, are welded, the work may be mounted on suitable rollers, not shown, and rotated as the welding progresses to maintain the electrode 48 in substantially the same position throughout the welding operation.

Figure 5:
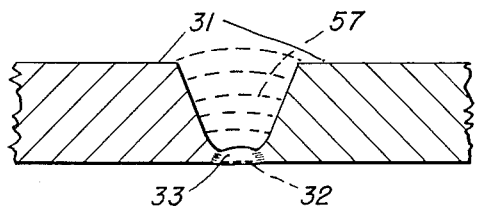
Figure 6:
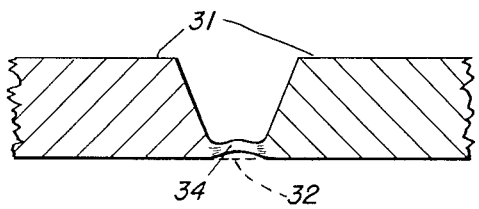

In the case of thick materials, such as the ends 31 of Fig. 5, after the deposition of the root bead 33, the groove may be filled with further weld deposits 57 in any preferred conventional way. Care should be taken, however, that in making the first weld deposit 57 the root bead 33 is not deformed or burnt through as will happen at times if high welding heats are employed. To avoid these unwanted effects the first weld deposit 57 is preferably deposited from comparatively thin wires or electrodes with comparatively low welding heats. It is also desirable at times to maintain a static pressure against the root face of the joint during the deposition of the first deposit 57 so that if any portion of root bead 33 is fused it will maintain the desired contour due to the molding action of the pressurizing gas.

As specific examples of the conditions employed and the results obtained in accordance with the novel method of this invention, a number of pairs of the ends 31 of Figs. 3–7, chosen of the austenitic chrome-nickel steel designated as 18–8, were formed into the component parts of U welding grooves each characterized by a 45° included angle and a bottom radius of ¼". The lips 35 were ¹⁄₃₂" thick. Both tack welds and root beads were deposited in these grooves in accordance with the foregoing disclosure. A "heli-arc" welding apparatus of 120 amperes rated capacity using a gas cooled torch was employed. The electrode was of tungsten and argon gas was used as a shielding gas. The positive static pressure maintained against the root side of the seam was produced by pressurized argon gas. Both tack welds and root beads were deposited with an arc of about 13–17 volts at 90 amperes. The root beads were deposited at an arc traverse rate of approximately 4.5 inches per minute and were about ³⁄₁₆" inch wide.

Figure 7:
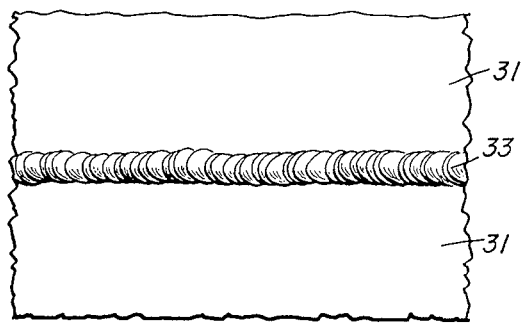
Fig. 7 is a fragmentary bottom view of a welded joint.

Complete penetration of the edges joined and a root bead of satisfactory characteristics were obtained at positive static gas pressure values as low as about 0.0003 p. s. i. These root beads were well shaped and of relatively uniform root face contour, there was no evidence of lack of penetration, metal overlay, cracks, notches and other weakening defects. These root beads, however, extended downwardly from the original bottom lip line in excess of ¹⁄₁₆". Root beads were deposited at increased positive static pressures. As the static pressure was increased the quality of the root bead, as evidenced by the root face thereof, improved and it became smoother and of more uniform contour, also the extension below the original bottom lip line decreased. The root bead 30 of Fig. 4 was deposited at a positive static pressure of 0.003 p. s. i. Root bead 30 was free from defects and of uniform contour throughout. Root bead 30 extended about ¹⁄₃₂" below the original lip bottom line 32. The root bead 33 of Fig. 5 was deposited at a positive pressure of about 0.03 p. s. i. This bead 33 was as perfect as root bead 30 and in addition was substantially flat i. e. its root face approximately coincided with the original lip bottom line 32. As the positive static pressure was further increased the quality of the root beads remained about the same but the root faces thereof were located above rather than at or below the line 32. Thus the bead 34 of Fig. 6, which was deposited at a positive static pressure of 0.08 p. s. i. has the root face thereof extending about ¹⁄₁₆" above the line 32. Fig. 7 shows the root face of root bead 33, the root faces of the other root beads mentioned above are very similar in appearance. As shown the root face of the root bead 33 closely resembles the top or cover bead of a conventional weld. As indicated heretofore, all pressures given are gauge pressures.

Numerous root beads were deposited, under the conditions set forth above, between ends formed of metals such as carbon steel, carbon-moly steel, and 4–6 chrome steel which approximate 18–8 in density, melting point etc., the results obtained closely approximating those obtained with 18–8.

The term "root" as used in the above description approximates in meaning the term "bottom" and is to all intents and purposes interchangeable therewith. It must be understood, however, that the "root side" or "face" or "bottom side" or "face" of a joint is the side of a joint opposite to the "top side" or "face" through which the electrode enters; this being so even in overhead welding when the "root side" is above the "top side."

What is claimed is:

1. The method of welding a joint between metal parts having the edges to be joined of a thickness within the sheet metal range and not substantially in excess of ⅛ of an inch, which comprises abutting said edges along the line of the joint, fixedly positioning said metal parts relative to each other to maintain the abutment of said edges, apply heat to adjacent portions of said abutted edges at a rate sufficiently high to rapidly fuse completely through the full thickness thereof to the bottom face of the joint and to form a molten weld metal pool of approximately constant width throughout the depth thereof, providing a gas blanket at a positive static pressure against the bottom face of the joint during fusion and solidification of said weld metal pool, adjusting the thickness of said edges, the rate at which heat is applied to said adjacent portions of said edges and the static pressure maintained against said bottom face to provide a molten weld metal pool, as above set forth, which is held together in position between unfused metal without formation of discreet projections on the bottom face thereof and which is predeterminedly shaped during fusion and solidification, and maintaining the fixed positional relation of said metal parts during fusion and solidification of said weld metal pool.

2. The method of welding a joint between metal parts as defined in claim 1, in which filler metal is supplied to the joint and fused by the heat applied to said adjacent portions of said abutted edges to augment the metal of said weld metal pool.

3. The method of welding a joint between metal parts each provided with a welding lip of a thickness within the sheet metal range and not substantially in excess of ⅛ of an inch, which comprises juxtaposing said parts to position the lips thereof in abutting relation along the line of the joint, fixing said parts relative to each other to maintain said lips in said abutting relation, applying heat at a high rate to adjacent limited portions of said abutted lips to rapidly fuse completely through the full thickness thereof to the bottom face of the joint and to form a molten weld metal pool of approximately constant width throughout the depth thereof, providing a gas blanket at a positive static pressure against the bottom face of said joint during fusion and solidification of said weld metal pool, adjusting the rate at which heat is applied to confine the metal fusion to substantially said limited portions of said lips and to provide a molten weld metal pool, as above set forth, of a width and at a temperature such that it is held together in position between the surrounding unfused metal without formation of the discreet projections on the bottom face thereof, adjusting the static pressure maintained against the bottom face of the joint to predeterminedly shape the bottom face of said weld metal pool during fusion and solidification thereof, and maintaining the fixed positional relation of said metal parts during fusion and solidification of said weld metal pool.

4. The method of welding a joint between metal parts as defined in claim 3, in which the heat is applied to said adjacent limited portions of said lips at a rate adjusted to provide a molten weld metal pool of a width and at a temperature such that the adhesive forces set up between the metal thereof and the surrounding unfused metal are sufficient to support at least the major portion of the weight of the molten weld metal pool, furthermore said provided molten weld metal pool of such fluidity that the cohesive forces set up therein are sufficient to hold it together without formation of discreet projections on the bottom face thereof.

5. The method of welding a joint between metal parts as set forth in claim 3, in which a shield of protective gas is maintained over and around said adjacent limited portions of said lips and said weld metal pool during fusion and solidification thereof, and said gas blanket maintained against the bottom face of said joint is formed of a protective gas.

6. The method of welding a joint between metal parts as set forth in claim 3 in which a shield of protective gas is maintained over and around said adjacent limited portions of said lips and said weld metal pool during fusion and solidification thereof, and said gas blanket maintained against the bottom face of said joint is formed of a protective gas, the protective gas of said shield and the protective gas of said blanket being a noble gas taken from the class made up of helium and argon.

7. The method of welding a joint between metal parts as set forth in claim 3, in which the application of heat to said adjacent limited portions of said lips is discontinued when said molten metal pool sinks relative to the surrounding unfused metal, and the molten weld metal pool forming operation is sequentially repeated along the line of the joint to provide a series of adjacent, overlapping, solidified weld metal pools which integrally and continuously unite said metal parts.

8. The method of welding a joint between metal parts as set forth in claim 3 in which the static pressure maintained against the root face of the joint is adjusted within a range in the order of the static pressure required to support said molten metal pool.

9. The method of welding a joint between metal parts as defined in claim 3, in which the gas blanket against the bottom face of said joint during fusion and solidification of said weld metal pool is at a positive static pressure within the range of about 0.0003 p. s. i. to about 0.08 p. s. i.

10. The method of welding a joint between metal parts each provided with a welding lip of a thickness in the order of 1/32 of an inch which comprises juxtaposing said parts to position the lips thereof in abutting relation along the line of the joint, fixing said parts relative to each other to maintain said lips in said abutting relation, applying heat at a high rate to adjacent limited portions of said abutted lips to rapidly fuse completely through the full thickness thereof to the bottom face of the joint and to form a molten weld metal pool of approximately constant width throughout the full depth thereof, providing a gas blanket at a positive static pressure against the bottom face of said joint during fusion and solidification of said weld metal pool, adjusting the rate at which heat is applied to confine the metal fusion to substantially said limited portions of said lips and to provide a molten weld metal pool, as set forth above, of a width and at a temperature such that it is held together in position between surrounding unfused metal without formation of discreet projections on the bottom face thereof, adjusting the static pressure maintained against said bottom face of the joint to a value in the order of 0.03 p. s. i. to predeterminedly shape the bottom face of said weld metal pool during fusion and solidification thereof, and maintaining the fixed positional relation of said metal parts during fusion and solidification of said weld metal pool.

11. The method of welding a joint between metal parts as set forth in claim 10, in which the rate of heat application is so adjusted that the width of the molten weld metal pool throughout the depth thereof approximates 3/16 of an inch.

12. The method of welding a joint as set forth in claim 10, in which the heat is applied to said adjacent limited portions of said abutted lips by the discharge of electric current through an arc between a non-consumable electrode and said abutted lips while a stream of protective gas is discharged around the arc and over said adjacent limited portions of said abutted lips, and the electrode is moved along said abutted lips at a rate to maintain said molten metal pool of a width of about 3/16 of an inch throughout the full depth thereof.

References Cited in the file of this patent

UNITED STATES PATENTS

| | | |
|---|---|---|
| 1,830,783 | Burnish | Nov. 10, 1931 |
| 1,948,801 | Riemenschneider | Feb. 27, 1934 |
| 2,422,305 | Kopec | June 17, 1947 |
| 2,433,296 | Schaefer | Dec. 23, 1947 |
| 2,496,188 | Wiese | Jan. 31, 1950 |